Nov. 17, 1964

L. E. RUSSELL ETAL 3,157,015

LEAF PULVERIZER FOR ROTARY MOWERS

Filed June 24, 1963

*INVENTOR.*
LIONEL E. RUSSELL
DAVID F. M<sup>C</sup>NABB

BY *Head & Johnson*
ATTORNEYS

United States Patent Office 3,157,015
Patented Nov. 17, 1964

3,157,015
LEAF PULVERIZER FOR ROTARY MOWERS
Lionel E. Russell, Rte. 4, Claremore, Okla., and David F. McNabb, Rte. 1, Box 48, Catoosa, Okla.
Filed June 24, 1963, Ser. No. 289,943
1 Claim. (Cl. 56—25.4)

This invention relates to a leaf pulverizer for rotary mowers. More particularly, the invention relates to an attachment for rotary mowers for pulverizing leaves and other organic matter. Still more particularly, the invention relates to a lawn mower of the rotary type wherein a blade is rapidly rotated in a horizontal position and including means for the pulverization of leaves, grass, stems, etc., picked up by the mower.

One of the most popular types of mowers, especially for use in mowing lawns, is the rotary type. This type is usually provided with a frame having wheels for moving over the ground and including a motor or engine mounted on the frame with a downwardly extending shaft to which is affixed at the end thereof a flat blade. The blade is provided with sharp edges so that as it is rapidly rotated by the engine it engages and cuts grass, weeds, etc., as the mower is moved about. Improvements in this type of rotary mower include the provision of an arcuate discharge chute whereby grass and leaves and other organic matter on the area being mowed is discharged efficiently out the side of the mower.

When a lawn is mowed with this type of mower the effect is usually not pleasing within itself, particularly if there is a quantity of tree leaves, large grass stems, weed leaves, and other matter on the lawn. This is true since the mower picks up such leaves and organic matter and discharges it out the side to spread it over the freshly mowed area.

It is an object of this invention to provide means for pulverizing leaves and other organic matter in such a way that the discharge from the side of the rotary mower is of finely divided particles which readily sink within the grass itself to thus obviate the displeaisng appearance when the larger leaves and organic matter is left strewn over the top of the grass after it has been cut by mower.

Another object of this invention is to provide an attachment readily adaptable for most rotary mowers providing means for pulverization of leaves and similar organic matter.

Another object of this invention is to provide a rotary mower including means for the cutting, pulverizing and discharging the finely pulverized organic particles out the side of the mower.

These and other objects and a better understanding of the invention may be had by referring to the following description and claim taken in conjunction with the attached drawings in which:

This invention may be described as a leaf pulverizer attachment for rotary mowers. More particularly, but not by way of limitation, the invention may be described as a rotary mower comprising a frame defined in part by an inverted cup-shaped portion having an upwardly spiralled outlet passage opening in one side of said cup-shaped portion, wheels supported to said frame whereby the mower may be moved about, an engine supported on the exterior top of said frame, a vertical shaft extending downwardly from said engine and rotated by said engine, a flat horizontally positioned cutting blade affixed in the center thereof to said shaft, an axially bored collar member received by said shaft above said blade and within said inverted cup-shaped portion of said frame, and at least one horizontally extending leaf mulching member affixed at one end to said collar member, said leaf mulching member of a length when the outer end thereof is substantially the same distance from said shaft as the outer end of said blade.

Figure 1:
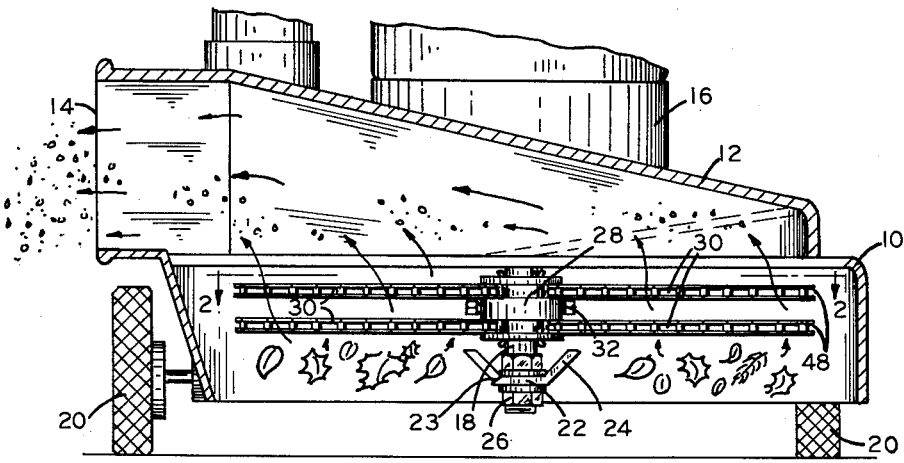
FIGURE 1 is a cross-sectional view of a rotary mower with the pulverizing attachment of this invention installed thereon.

Referring now to the drawings and first to FIGURE 1, a rotary lawn mower shown in cross section. The mower consists essentially of a frame which is basically defined as an inverted cup-shaped structural member 10. Extending through the top of the machine is preferably provided an upwardly spiralled discharge chute 12 which terminates in a discharge port 14. Supported atop the frame 10 is an engine 16. In some cases an electric motor is utilized, however, it is to be understood that when the word engine is utilized in this description such expression includes an electric motor. In some type of rotary mowers the engine or motor is displaced away from the center of the frame 10 and a pulley arrangement is utilized to drive the cutting mechanisms. Any of such arrangements are nevertheless within the purview of this invention and the leaf pulverizing device of the invention may be just as effectively used therewith in a manner to be described subsequently.

Extending downwardly from and rotated by the engine 16 is a shaft 18. Wheels 20 are provided to facilitate moving the mower over the ground surface to be mowed.

Affixed at the lower end of shaft 18 is a blade 22 which is typically a flat member having cutting edges on each of the end portions at the advanced edge thereof as the blade is rotated. Preferably blade 22 is provided with upswept wing portions 24 for purposes to be described subsequently. The blade 22, shown in the end view of FIGURE 1, may be supported to shaft 18 such as by means of nuts 26.

The mower described up to this point is more or less of a known, commonly used and typical design. Blade 22 is rotated rapidly by the engine 16 to cut grass and weeds as it is moved over the earth. The upswept angularly disposed wing portion 24 operates in the manner of a fan to pull air under the lower edge of the inverted cup-shaped frame 10 and force it around the discharge chute 12 and out opening 24. This air movement moves the cut grass, leaves and any other organic matter on the surface of the area being cut out the mower to be discharged out port 14. In the typical mower, as described up to this point, the movement of the air affected by the angular portions 24 of blade 22 results in the discharge of leaves and other light organic matter in more or less whole form so that after a lawn or other area is mowed this material is strewn over the surface. In order to achieve a beautiful lawn it is necessary that the leaves, large grass, stems, etc., be raked from the surface of the lawn after it is mowed.

This invention provides a means of effectively masticating and pulverizing leaves and other large portions of organc matter into very fine portions as they are discharged from the mower. Basically, the invention includes the provision of a collar member 28 supported to the shaft 18 within the cup-shaped frame portion 10 and above blade 22. Affixed to the collar 28 is one or more horizontally extending leaf pulverizing members 30. The collar 28 is affixed to shaft 18 so that the leaf pulverizing member 30 rotates with shaft 18 and blade 22. As leaves and other large organic matter is forced upwardly by the effect of blade 22, and especially by the effect of the upswept angular wing portion 24, the leaf pulverizing member 30 encounters such leaves and other organic matter, and due to the rapid rotation thereof, breaks and crushes them into very fine particles as they are discharged out of the mower.

Although a single leaf pulverizing member 30 achieves results of this invention, the optimum embodiment includes the use of a multiplicity of such members. In the view of FIGURE 1 leaf pulverizing members 30 are shown extending in two levels. This is the preferred arrangement.

Figure 2:
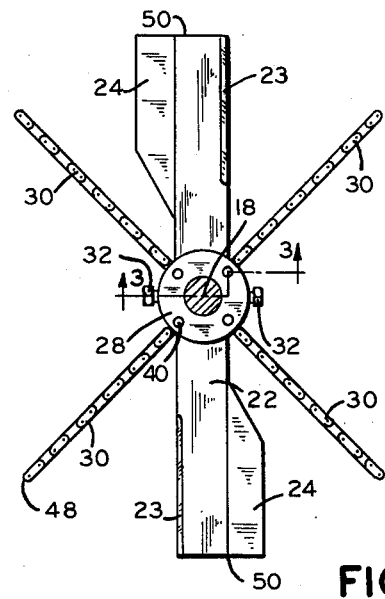
FIGURE 2 is a cross-sectional view taken along the line 2—2 of FIGURE 1 showing a top view of the pulverizer attachment of this invention.

Referring to FIGURE 2 more details of the leaf pulverizing attachment of this invention are shown. Collar 28 is supported to shaft 18 such as by means of set screws 32. In the view shown in FIGURE 2 four leaf pulverizing members 30 are shown for each layer, making, as illustrated in the combination of FIGURES 1 and 2, eight such members extending outwardly from collar 28.

Although a variety of different types of leaf pulverizing members 30 may be utilized, the preferred arrangement includes the use of chains. A typical bicycle chain functions exceedingly well in this application and the use of such type of chain is considered the preferred embodiment. Such chains have a degree of rigidity in one direction and great flexibility in the other. This characteristic helps generally support the chains 30 above blade 22 so that chain will not become wrapped around the blade 22 when it is in non-rotating or just starting to rotate condition. As the chains 30 are rapidly rotated by shaft 18 they become, in all practical effects, stiff solid members. However, should the rotating chains 30 encounter some solid object they will flex to prevent the bending of shaft 18.

Figure 3:
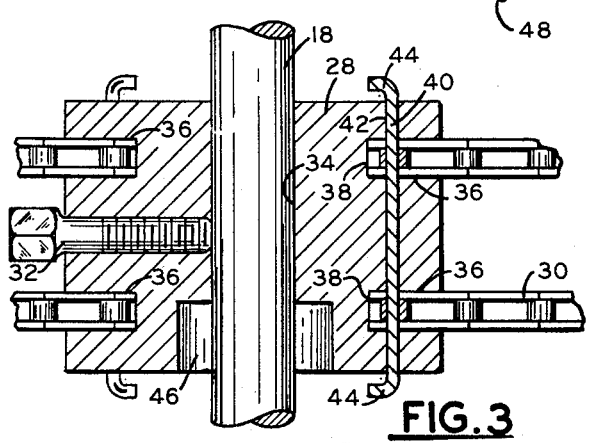
FIGURE 3 is a cross-sectional view taken along the line 3—3 showing details of construction of the collar member of the invention.

Referring to FIGURE 3 the collar member 28 of the device of this invention is shown in more detail. Collar 28 is provided with an axial bore 34 to receive shaft 18. Set screws 32 (only one of which is shown in FIGURE 3, although at least two are preferred) hold the collar member 28 in its proper position on the shaft 18.

Collar member 28 is preferably a cylindrical member provided with a peripheral groove 36 in the exterior cylindrical surface thereof. When two layers of leaf pulverizing members 30 are to be provided, as shown in FIGURE 1, two of such peripheral grooves 36 are utilized and are spaced apart from each other. It can be seen that three, four, or any larger number of layers of the leaf pulverizing members 30 may be provided.

In the embodiment shown in FIGURE 3 the inward ends 38 of the chains 30 are extended within the peripheral grooves 36 and held in position by pins 40 which extend through pin openings 42 bored parallel the cylindrical axis of the collar member 28. Pins 40 may be provided with nuts at each end to hold them in position or may simply be bent at the ends 44 as shown.

A recessed area 46 may be provided in the lower portion of the collar member 28 to receive the upper blade retaining nut 26, as shown in FIGURE 1, to enable the collar member to be spaced closer to blade 22.

The leaf pulverizing device of this invention may be supplied as an accessory item for use on existing rotary type mowers or, a mower may be specifically designed for utilization of the device and concept of this invention.

The length of each leaf pulverizing member 30 is preferably such that the outer end 48 is at a distance from the center of shaft 18 substantially equal the outer end 50 of blade 22 so that the total diameter required for the leaf pulverizing members 30 is the same as for blade 22.

Although the invention has been described with a certain degree of particularity it is manifest that many changes may be made in the details of construction and the arrangement of components without departing from the spirit and scope of this disclosure.

What is claimed:

A mower comprising, in combination:
  an inverted cup-shaped frame having an upwardly spiral outlet passage opening in one side thereof;
  wheels supported to said frame whereby the mower may be moved about;
  an engine supported on the exterior top of said frame;
  a vertical shaft extending downwardly from and rotated by the said engine;
  a flat horizontally positioned cutting blade affixed in the center thereof to said shaft for rotation by said engine, said blade having cutting edges formed on each forward edge thereof;
  integrally formed upswept wing portions at each end of said blade opposite said cutting edges;
  an axially bored collar member received by said shaft above said blade and within said inverted cup-shaped frame; and
  at least two vertically spaced apart layers of horizontally extending leaf masticating chain members, each of said layers comprising a multiplicity of lengths of flexible chain each affixed at one end thereof to said collar member, each of said chains comprising a plurality of links pivotally interconnected to move solely about substantially vertical axes, each of said chains being of a length wherein the outer end thereof is substantially the same distance from said shaft as the outer ends of said blade.

References Cited by the Examiner

UNITED STATES PATENTS

| | | | |
|---|---|---|---|
| 2,504,365 | 4/50 | Wallace | 56—29 X |
| 2,641,100 | 6/53 | Sylvester | 56—295 X |
| 2,760,327 | 8/56 | Bovee | 56—255 X |
| 3,011,793 | 12/61 | McElhinney et al. | |

T. GRAHAM CRAVER, *Primary Examiner.*

ANTONIO F. GUIDA, ARNOLD RUEGG, *Examiners.*